United States Patent [19] [11] 4,408,841
Arai et al. [45] Oct. 11, 1983

[54] VARIABLE POWER LENS SYSTEM FOR COPYING

[75] Inventors: Yasunori Arai, Hatoyama; Ryota Ogawa, Kawagoe, both of Japan

[73] Assignee: Asahi Kogaku Kogyo Kabushiki Kaisha, Tokyo, Japan

[21] Appl. No.: 311,728

[22] Filed: Oct. 15, 1981

[30] Foreign Application Priority Data

Oct. 18, 1980 [JP] Japan .................. 55-145989

[51] Int. Cl.³ .................. G02B 15/00
[52] U.S. Cl. .................. 350/425
[58] Field of Search .................. 350/423, 425

[56] References Cited

U.S. PATENT DOCUMENTS 3,728,010 4/1973 Mikami .................. 350/425
3,865,470 2/1975 McCrobie et al. .................. 350/425
3,883,228 5/1975 Betensky .................. 350/425
3,912,374 10/1975 Liu .................. 350/425
4,359,269 11/1982 Itoh .................. 350/425

FOREIGN PATENT DOCUMENTS 55-11260 1/1980 Japan .................. 350/426

Primary Examiner—John K. Corbin
Assistant Examiner—Scott J. Sugarman
Attorney, Agent, or Firm—Sughrue, Mion, Zinn, Macpeak and Seas

[57] ABSTRACT

A variable power lens system capable of both enlargement and reduction of the image of an original to be copied, in which the distance between the object and image surfaces constant. The lens system includes a first lens group having a first positive focal length and a second lens group having a negative focal length. The distance between the first and second lens groups is variable. A lens power of each lens group is increased so that a distance between the object surface and the lens is long in comparison with a distance between the lens and the image surface and at the same time the variable power ratio is greater than 2 with high performance and compactness.

2 Claims, 5 Drawing Figures

VARIABLE POWER LENS SYSTEM FOR COPYING

BACKGROUND OF THE INVENTION

The present invention relates to a variable power lens system for use in a copying system such as a copying machine, in which the enlargement and the reduction can be carried out while maintaining the distance between the object and image surfaces constant.

In a conventional copying variable power lens system of such a type, the variable power ratio is small and the variable power range covers only from the equal magnification to the reduction magnification. Such a type of a lens system is, for instance, disclosed in the Japanese Laid Open Patent Application 44544/1979 and in the Japanese Patent Application 77925/1979 which is assigned to the present assignee. The Japanese Patent Application 77925/1979 exactly corresponds to U.S. patent application Ser. No. 154,261 filed on May 29, 1980 now U.S. Pat. No. 4,333,711 and entitled "Zoom Lens for Copying". However, the proposed lens system is composed of two lens groups and has a small variable power ratio less than 2. In addition, the first lens group has a negative focal length while the second lens group has a positive focal length. This type of lens system is so called a "retrofocus type". Accordingly, the distance between the object surface and the lens is short in comparison with the distance between the lens and the image surface. In case of the copying machine in which a scanning mirror is disposed between the object surface and the lens, it is therefore disadvantageous that a sufficient space therefor cannot be formed.

SUMMARY OF THE INVENTION

In order to overcome the above noted defect, an object of the present invention is to provide a variable power lens system for copying, in which a first lens group is positive and a second lens group is negative, a lens power of each lens group being increased so that a distance between the object surface and the lens is long in comparison with a distance between the lens and the image surface and at the same time the variable power ratio is greater than 2 with high performance and compactness.

DETAILED DESCRIPTION OF THE PREFERRED EMBODIMENT

Figure 1:
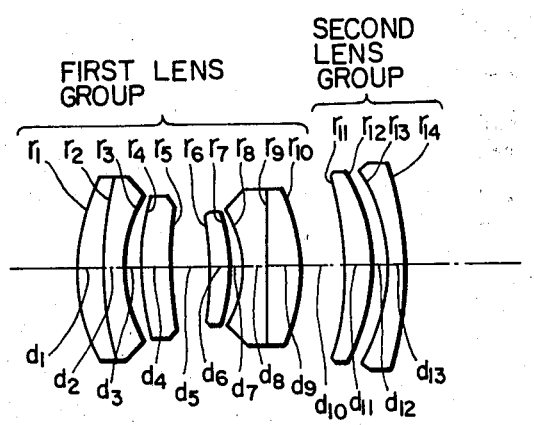
FIG. 1 is a cross sectional view of the lens corresponding to the enlargement end in accordance with the Example of the present invention.
Figure 2A:
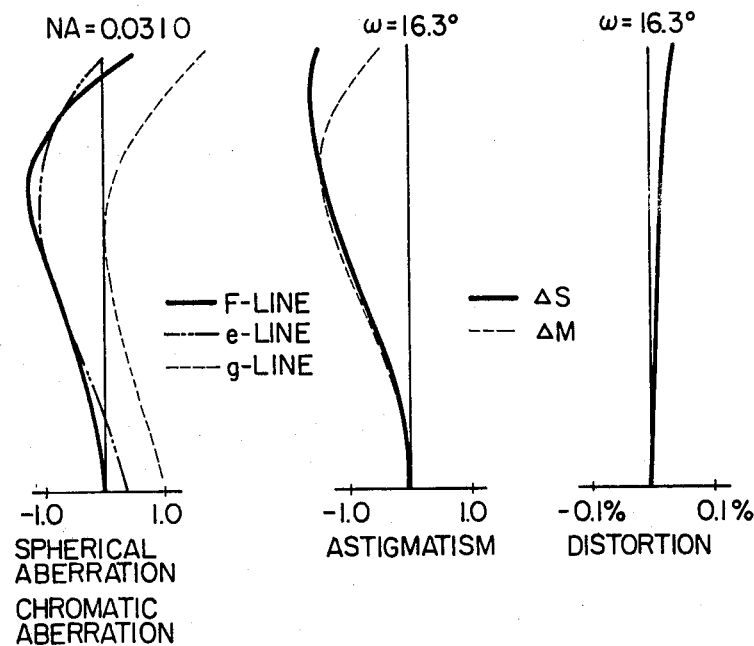
FIGS. 2(a) to (c) show graphs of aberration curves of the Example of the present invention, (a) designating the enlargement, (b) the equal magnification and (c) the reduction.
Figure 2B:
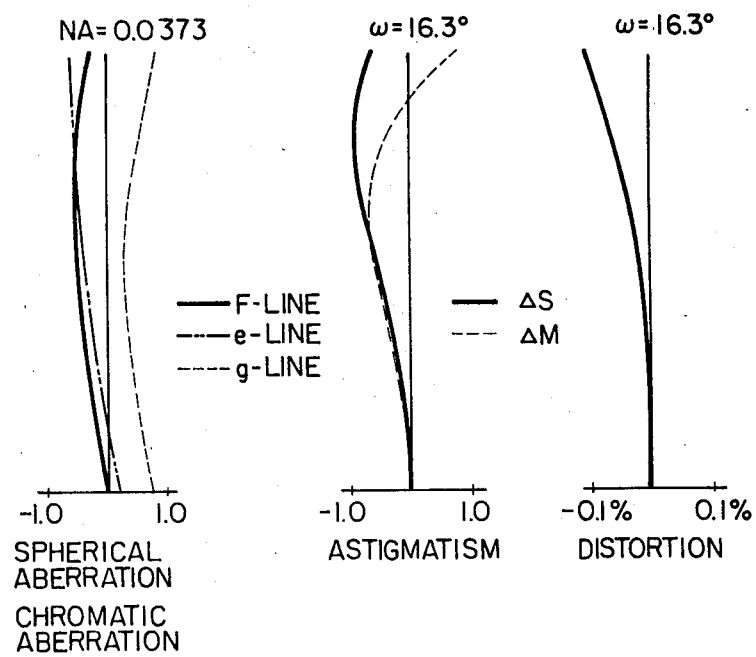
Figure 2C:
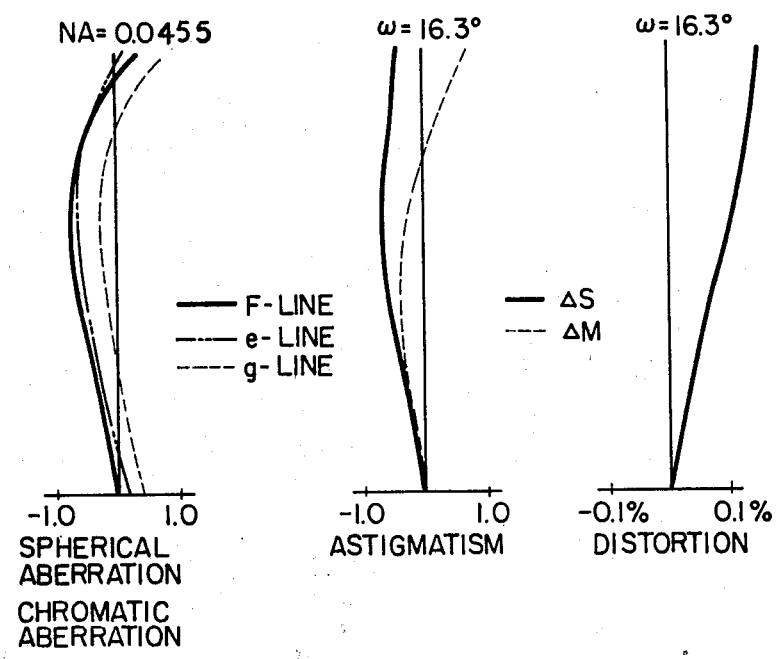

The present invention will now be described. A variable power lens system for copying in accordance with the present invention, composed, in order from the object side, of a first lens group having a positive focal length and a second lens group having a negative focal length, in which a distance between said first and second lens group is variable and the overall lens system is movable while maintaining constant a distance between the object surface and the image surface. The variable power lens system for copying according to the present invention is characterized in that the movement of the first lens group functions mainly as a variator of magnification power and the second lens group mainly serves to maintain constant the distance between the object surface and the image surface. The first lens group is constructed on the basis of a single focus lens used for copying. The first lens group is composed, in order from the object side, of a cemented lens consisting of a positive lens a convex surface of which is directed to the object and a negative lens a concave surface of which is directed to the image, a positive meniscus lens a convex surface of which is directed to the object, a stop diaphragm, a positive meniscus lens a convex surface of which is directed to the image and a cemented lens consisting of a negative lens a concave surface of which is directed to the image side and a positive lens a convex surface of which is directed to the image. The second lens group consists of a positive meniscus lens a convex surface of which is directed to the image and a negative meniscus lens a convex surface of which is directed to the image side. The variable power lens system satisfies the following conditions:

$$Mmax/Mmin < 3.0 \tag{1}$$

$$1.2 < |f_{II}|/f_{max} < 3.0 \quad (f_{II} < 0) \tag{2}$$

$$0.02 \leq \Delta D_{I,II}/f_{max} \leq 0.20 \tag{3}$$

$$0.10 \leq |r_{IIP}|/f_{max} \leq 0.30 \quad (r_{IIP} < 0) \tag{4}$$

where,

Mmax is the magnification on the high magnification side (on the enlargement side) in the magnification power range;

Mmin is the magnification on the low magnification side (on the reduction side) in the magnification power range;

Mmax/Mmin is the ratio of variable power;

fmax is the overall focal length of the lens system at an equal magnification;

$f_{II}$ is the focal length of said second lens group;

$\Delta D_{I,II}$ is the amount of movement between said first and second lens groups; and $r_{IIP}$ is the radius of curvature of an image side surface of the positive meniscus lens in the second lens group.

The specific conditions will now be described.

The condition (1) defines a range of the variable power ratio according to the present invention. The lens system according to the present invention has a great variable power ratio although it is of two lens group type. However, if the ratio is increased exceeding the upper limit of the condition (1), distortion, coma aberration and the like are increased due to the asymmetric construction of the lens system. In particular, such aberrations are undesirable in a copying lens system which allows a minimum possible distortion.

The condition (2) relates to a power of the second lens group. When the upper limit of the condition (2) is exceeded, a negative refractive power of the second lens group is small, which is available for the aberration compensation but leads to the increment of the diameter of the rear lens resulting in the enlargement of the overall lens system. On the other hand, when the lower limit is exceeded and the negative power of the second lens group is increased, it is possible to make the lens system compact but the first lens group necessarily has a strong positive power, as a result of which various aberrations such as distortion are not well corrected.

The condition (3) concerns the power distribution under the condition (2). When the upper limit of the condition (3) is exceeded, although available for aberration compensation, since the distance between the first and second lens groups is lengthened, the diameter of the lens must be increased because a sufficient amount of marginal light is required in the copying lens. On the other hand, when the lower limit is exceeded, the refractive powers of the first and second lens groups must be necessarily increased in order to obtain a high variable power ratio. This leads to an excessive asymmetric construction of the lens system and then it is difficult to compensate for the aberrations.

The condition (4) defines the radius $r_{IIP}$ of curvature of the image side surface of the positive meniscus lens in the second lens group. It relates to the aberrations of the overall second lens group. When $r_{IIP}$ becomes great exceeding the upper limit of the condition (4), the refractive powers of the positive and negative lenses of the second lens group are excessively small. This leads to compensation of the chromatic aberration. Inversely, when the lower limit for $r_{IIP}$ is exceeded, the spherical aberration generated in this lens surface is extremely increased. This is not desirable.

Apart from the specific conditions, according to the present invention, the first lens group has a negative focal lengto so that the space between the object surface and the lens is increased. This will be more specifically explained.

Figure 3:
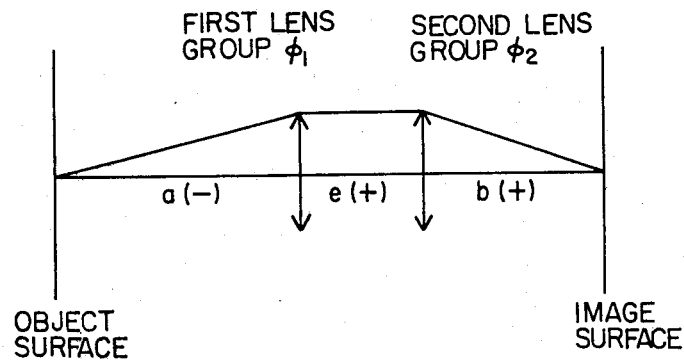
FIG. 3 is a schematic illustration in which the focusing relationship of the Example of the present invention is represented.

FIG. 3 shows a schematic lens system in which the object surface, the first lens group having a power of $\phi_1$, the second lens group having a power of $\phi_2$ and the image surface are arranged in order from the left along the optical axis. The following equations are given:

$$\phi = \phi_1 + \phi_2 - e \cdot \phi_1 \cdot \phi_1 \quad (1)$$

$$-a = (-1/M + 1 - e \cdot \phi_2)/\phi \quad (2)$$

$$b = (-M + 1 - e \cdot \phi_1)/\phi \quad (3)$$

$$S = -a + e + b = \{2 - e(\phi_1 + \phi_2) - M - (1/M)\}/\phi \quad (4)$$

where, e is the distance between the first lens group and the second lens group;

$\phi$ is the resultant focal length of the first and second lens groups;

a ($<0$) is the distance between the object surface and the first lens group;

b ($>0$) is the distance between the second lens group and the image surface;

M is the focussing magnification of the overall lens system; and

S is the distance between the object surface and the image surface. The equation (4) tells that S is fixed even if the powers $\phi_1$ and $\phi_2$ of the first and second lens groups are replaced by each other. However, the distance a to the object surface is varied by the replacement of $\phi_1$ and $\phi_2$, as follows.

$$-a' = (-1/M + 1 - e \cdot \phi_1)/\phi \quad (2')$$

A difference between (2) and (2') is given as follows.

$$-(a - a') = e(\phi_1 - \phi_2)/\phi \quad (5)$$

Thus, according to the present invention, if the first lens group is positive and the second lens group is negative, it is possible to lengthen the distance to the object surface by the amount indicated by the equation (5) in comparison with the case where the first lens group is negative and the second lens group is positive. In case where the mirror or the like for scanning the object surface is used, the present invention is effectively applicable thereto.

Also, according to the present invention, a split dagor type which is most popular for a single focus copying lens system is used. It is however, possible to use a Heliar type, a Gauss type or a modified type thereof.

The Example of the present invention will now be described, in which r is the radius of curvature, d is the lens thickness or the gap, N is the refractive index at F-line of the optical material, $\nu$ is the Abbe number, f is the overall focal length F is the F number with respect to the infinite distance object, M is the magnification, $\omega$ is the half viewing angle of the primary light ray. NA is the numerical aperture represented as follows.

$$Na = 1/2F_\infty(1 + |M|)$$

Example
$F_\infty = 5.6$
$f = 238.884 \sim 251.694$
$NA = 0.0544 \sim 0.0370$
$M = -0.64 \sim -1.41$
$\omega = 16.3°$

| Lens Surface | r | d | N | v |
|---|---|---|---|---|
| 1. | 60.078 | 7.49 | 1.69100 | 54.8 |
| 2. | 82.000 | 8.15 | 1.54072 | 47.2 |
| 3. | 41.500 | 4.56 | | |
| 4. | 64.838 | 10.62 | 1.65160 | 58.6 |
| 5. | 116.372 | 12.63 | | |
| 6. | −106.775 | 6.41 | 1.62041 | 60.3 |
| 7. | −56.405 | 3.64 | | |
| 8. | −40.196 | 8.83 | 1.60342 | 38.0 |
| 9. | −900.000 | 11.09 | 1.67790 | 55.3 |
| 10. | −52.200 | 5.30 ~ 21.41 | | |
| 11. | −85.349 | 8.84 | 1.74950 | 35.3 |
| 12. | −53.858 | 5.47 | | |
| 13. | −52.200 | 5.00 | 1.78590 | 44.2 |
| 14. | −112.397 | | | |

$$\frac{Mmax}{Mmin} = 2.2$$

$$\frac{|F_{II}|}{fmax} = 1.780$$

$$\frac{\Delta D_{I,II}}{fmax} = 0.064$$

$$\frac{|r_{IIP}|}{fmax} = 0.214$$

from the equations (5) at the enlargement of $M = -1.41X$,
$\phi_1 = 0.0059285$
$\phi_2 = -0.0022311$
$e = 30.258$
then,
$-(a - a') = 60.3$ mm Since the respective lenses have physical thickness, the distance u from the object surface to the apex of the first lens group having the positive focal length is 387.8 mm at the enlargement end $M = 1.41x$. In the replaced arrangement, that is, the lens system in which the first lens group is composed of a negative lens, the distance u' from the object surface to the apex of the first lens group is 355.5 mm at the same enlargement end M=−1.41X. The extra space (u−u')=32.3 mm can be obtained. This space is available for the arrangement of the scanning mirror or the like for the copying machine.

What is claimed is:

1. In a variable power lens system for copying, composed in order from the object side, of a first lens group having a positive focal length and a second lens group having a negative focal length, in which a distance between said first and second lens groups is variable and the overall lens system is movable while maintaining constant a distance between the object surface and the image surface, said variable power lens system for copying comprising an improvement wherein the movement of the first lens group functions mainly as a variator of magnification power and the second lens group mainly serves to maintain constant the distance between the object surface and the image surface, said first lens group being constructed on the basis of a single focal lens system used for copying, and being composed, in order from the object side, of a cemented lens consisting of a positive lens a convex surface of which is directed to the object and a negative lens a concave surface of which is directed to the image, a positive meniscus lens a convex surface of which is directed the object, a positive meniscus lens a convex surface of which is directed to the image, and a cemented lens consisting of a negative lens a concave surface of which is directed to the object side and a positive lens a convex surface of which is directed to the image, and said second lens group consisting of a positive mensicus lens a convex surface of which is directed to the image side, said variable power lens system satisfying the following conditions:

$$\text{Mmax/Mmin} < 3.0 \quad (1)$$

$$1.2 < |f_{II}|/f_{max} < 3.0 \quad (f_{II} < 0) \quad (2)$$

$$0.02 \leq \Delta D_{I,II}/f_{max} \leq 0.20 \quad (3)$$

$$0.10 \leq |r_{IIP}|/f_{max} \leq 0.30 \quad (r_{IIP} < 0) \quad (4)$$

where,

Mmax is the magnification on the high magnification side (on the enlargement side) in the magnification power range;

Mmin is the magnification on the low magnification side (on the reduction side) in the magnification power range;

Mmax/Mmin is the ratio of variable power;

$f_{max}$ is the overall focal length of the lens system at an equal magnification;

$f_{II}$ is the focal length of said second lens group;

$\Delta D_{I,II}$ is the amount of movement between said first and second lens groups; and $r_{IIP}$ is the radius of curvature of the image side surface of the positive meniscus lens in the second lens group.

2. In a variable power lens system for copying, composed, in order from the object side, of a first lens group having a positive focal length and a second lens group having a negative focal length, in which a distance between said first and second lens groups is variable and the overall lens system is movable while maintaining constant a distance between the object surface and the image surface, said variable power lens system for copying comprising an improvement wherein the movement of the first lens group functions mainly as a variator of magnification power and the second lens group mainly serves to maintain constant the distance between the object surface and the image surface, said first lens group being constructed on the basis of a single focul lens system used for copying, and being composed, in order from the object side, of a cemented lens consisting of a positive lens a convex surface of which is directed to the object and a negative lens a concave surface of which is directed to the image, a positive meniscus lens a convex surface of which is directed the object, a positive meniscus lens a convex surface of which is directed to the image and a cemented lens consisting of a negative lens a concave surface of which is directed to the object side and a positive lens a convex surface of which is directed to the image, and said second lens group consisting of a positive meniscus lens a convex surface of which is directed to the image side, said variable power lens system satisfying the following conditions:

$F_\infty = 5.6$
$f = 238.884 \sim 251.694$
$NA = 0.0544 \sim 0.0370$
$M = -0.64 \sim -1.41$
$\omega = 16.3°$

| Lens Surface | r | d | N | ν |
|---|---|---|---|---|
| 1. | 60.078 | 7.49 | 1.69100 | 54.8 |
| 2. | 82.000 | 8.15 | 1.54072 | 47.2 |
| 3. | 41.500 | 4.56 | | |
| 4. | 64.838 | 10.62 | 1.65160 | 58.6 |
| 5. | 116.372 | 12.63 | | |
| 6. | −106.775 | 6.41 | 1.62041 | 60.3 |
| 7. | −56.405 | 3.64 | | |
| 8. | −40.196 | 8.83 | 1.60342 | 38.0 |
| 9. | −900.000 | 11.09 | 1.67790 | 55.3 |
| 10. | −52.200 | 5.30 ~ 21.41 | | |
| 11. | −85.349 | 8.84 | 1.74950 | 35.3 |
| 12. | −53.858 | 5.47 | | |
| 13. | −52.200 | 5.00 | 1.78590 | 44.2 |
| 14. | −112.397 | | | |

$$\frac{M\text{max}}{M\text{min}} = 2.2$$

$$\frac{|F_{II}|}{f\text{max}} = 1.780$$

$$\frac{\Delta D_{I,II}}{f\text{max}} = 0.064$$

$$\frac{|r_{IIP}|}{f\text{max}} = 0.214$$

$M = -1.41X$
$\phi_1 = 0.0059285$
$\phi_2 = -0.0022311$
$e = 30.258$
and,
$-(a-a') = 60.3$ mm.

* * * * *